United States Patent
Croston et al.

(10) Patent No.: US 11,527,064 B1
(45) Date of Patent: Dec. 13, 2022

(54) COMBINED 2D AND 3D PROCESSING OF IMAGES OR SPACES

(71) Applicant: REscan, Inc., Redwood City, CA (US)

(72) Inventors: John Adam Croston, Redwood City, CA (US); Teja Yerramsetty, Redwood City, CA (US); Botond Bognar, Redwood City, CA (US); Donald L Alvarez, Woodinville, WA (US)

(73) Assignee: REscan, Inc., Menlo Park, CA (US)

( * ) Notice: Subject to any disclaimer, the term of this patent is extended or adjusted under 35 U.S.C. 154(b) by 6 days.

(21) Appl. No.: 17/374,820

(22) Filed: Jul. 13, 2021

Related U.S. Application Data (63) Continuation-in-part of application No. 16/601,444, filed on Oct. 14, 2019, now Pat. No. 11,061,557, which is a continuation-in-part of application No. 15/919,585, filed on Mar. 13, 2018, now Pat. No. 10,444,985, which is a continuation-in-part of application No. 15/388,935, filed on Dec. 22, 2016, now Pat. No. 10,579,138, and a continuation-in-part of application No. 15/389,059, filed on Dec. 22, 2016, now Pat. No. 10,089,784.

(60) Provisional application No. 63/053,550, filed on Jul. 17, 2020, provisional application No. 62/863,245, filed on Jun. 18, 2019, provisional application No. 62/470,405, filed on Mar. 13, 2017.

(51) Int. Cl.
*G06V 20/20* (2022.01)
*G06V 10/22* (2022.01)
*G06N 20/00* (2019.01)
*G06F 3/04842* (2022.01)
*G06F 3/04845* (2022.01)
*G06F 3/04815* (2022.01)

(52) U.S. Cl.
CPC .......... *G06V 20/20* (2022.01); *G06F 3/04815* (2013.01); *G06F 3/04842* (2013.01); *G06F 3/04845* (2013.01); *G06N 20/00* (2019.01); *G06V 10/235* (2022.01)

(58) Field of Classification Search
CPC ...... G06V 20/20; G06V 10/235; G06N 20/00; G06F 3/04815; G06F 3/04842; G06F 3/04845
See application file for complete search history.

(56) References Cited

U.S. PATENT DOCUMENTS

| | | | |
|---|---|---|---|
| 9,432,655 B2 * | 8/2016 | Lee | H04N 13/254 |
| 10,445,898 B2 * | 10/2019 | Liu | G06T 7/80 |
| 2002/0050988 A1 * | 5/2002 | Petrov | G06V 10/10 |
| | | | 345/418 |

(Continued)

*Primary Examiner* — Stephen G Sherman
(74) *Attorney, Agent, or Firm* — Rimon Law, P.C.

(57) ABSTRACT

2D and 3D data of a scene are linked by associating points in the 3D data with corresponding points in multiple different 2D images within the 2D data. Labels assigned to points in either data can be propagated to the other data. Labels propagated to a point in the 3D data are aggregated, and the labels ranked highest are kept and propagated back to the 2D images. 3D data including labels produced in this manner allow partially obscured objects in certain views to be more accurately identified. Thus, an object can be manipulated in all 2D views of the 2D data in which the object is at least partially visible, in order to digitally remove, alter, or replace it.

16 Claims, 3 Drawing Sheets

(56) References Cited

U.S. PATENT DOCUMENTS

2018/0137366 A1* 5/2018 Szeto .................... G06T 7/74
2019/0384304 A1* 12/2019 Towal .................. G06V 20/56

* cited by examiner

COMBINED 2D AND 3D PROCESSING OF IMAGES OR SPACES

CROSS-REFERENCE TO RELATED APPLICATIONS

This application claims priority to U.S. Provisional Patent Application No. 63/053,550 filed on Jul. 17, 2020 and is a Continuation-in-Part of U.S. Non-Provisional application Ser. No. 16/601,444 filed Oct. 14, 2019; U.S. Non-Provisional application Ser. No. 16/601,444 claims priority to U.S. Provisional Patent Application No. 62/863,245 filed on Jun. 18, 2019 and is a Continuation-in-Part of U.S. Non-Provisional application Ser. No. 15/919,585 filed Mar. 13, 2018, now U.S. Pat. No. 10,444,985 issued on Oct. 15, 2019; U.S. Non-Provisional application Ser. No. 15/919,585 claims priority to U.S. Provisional Patent Application No. 62/470,405 filed Mar. 13, 2017 and is a Continuation-in-Part of U.S. Non-Provisional application Ser. No. 15/388,935 and also a Continuation-in-Part of U.S. Non-Provisional application Ser. No. 15/389,059, both filed on Dec. 22, 2016. U.S. Non-Provisional application Ser. No. 15/389,059, now U.S. Pat. No. 10,089,784 issued Oct. 2, 2018, is also a Continuation-in-Part of U.S. Non-Provisional application Ser. No. 15/388,935, now U.S. Pat. No. 10,579,138 issued Mar. 3, 2020. The disclosures of each of the aforementioned applications are hereby incorporated by reference herein.

BACKGROUND

Technical Field

The present invention is in the field of digital mapping and more particularly in the field of labeling objects in three-dimensional (3D) environments.

Background of the Invention

The current state of the art in image labeling is typically a two-dimensional (2D) operation performed on 2D image data and does not support operations on 3D data or combined 2D and 3D data. Current state of the art labelling methods present several challenges when applied to 3D environments. For example, labeling of objects within a 3D environment may require labeling of a substantial amount of 2D images because many 2D images are required to cover an entire room or space. Within the 2D images a particular object may be viewed from several viewpoints and thus may need to be relabeled multiple times. Another challenge is once an object is labeled, that label should be consistent from multiple viewpoints. Finally, it may be difficult to represent 3D shapes in 2D images, and to apply 2D attributes (e.g., surface color) to 3D shapes.

SUMMARY

When looking at rooms and buildings and architectural features, many of the regions one wants to label are defined either by shape independent of color changes (the floor is the floor even if part is carpeted and part is not) or by color changes independent of shape (the beige area is carpet, the rest of that flat surface is not). Humans are able to make decisions about 2D images to select the entire floor region with a mouse but it is difficult to write software that assists them in this process because typical image analysis software struggles to determine whether a surface in a picture is flat or not. Similarly, when looking at 3D meshes, there frequently is shape data that can be leveraged to guide shape-based labeling tasks (this flat surface is the floor), but today there is commonly not color or visual information attached to those 3D meshes to allow color-based selection operations to be performed or assisted.

An exemplary spatial analysis system comprises storage, logic, and a digital processor configured to execute at least some of the logic. In various embodiments the storage is configured to store two-dimensional data and three-dimensional data, where the three-dimensional data represents a three-dimensional environment.

The logic includes, in various embodiments, labeling logic configured to label objects within the two-dimensional data, where the labeling of objects results in labels being assigned to respective objects, or being assigned to two-dimensional data points representing the respective objects. The logic further includes association logic configured to associate points within the two-dimensional data to points within the three-dimensional data, and weighting logic configured to assign weights to the associations between points within the two-dimensional data and points within the three-dimensional data. The logic still further includes propagation logic configured to propagate the labels from the objects within the two-dimensional data to objects within the three-dimensional data, for example, in response to the assigned weights. The digital processor, in various embodiments, is configured to execute at least the weighting logic or the propagation logic, and in some embodiments is configured to execute all of the logic.

In various embodiments the exemplary system further comprises a data source including an 2D image capture device and a 3D capture device. The exemplary system also optionally can comprise an I/O configured to receive 2D and 3D data, and optionally can comprise interface logic configured for a user to specify a point in both 2D data and 3D data by marking the point in either the 2D or 3D data. The exemplary system further optionally can comprise navigation logic configured to navigate the three-dimensional environment represented by the three-dimensional data, and to present the labels propagated to the objects within the three-dimensional data to a user. The exemplary system further optionally can comprise analysis logic configured to determine relationships between objects within the three-dimensional data based on the labels propagated to these objects and their spatial relationships within the three-dimensional environment. The exemplary system further optionally can comprise training logic configured to train a machine learning system to label objects in additional two or three-dimensional data based on the labels propagated to objects within the 2D data or the 3D data.

An exemplary method of modeling a three-dimensional environment comprises receiving two-dimensional data and three-dimensional data regarding a three-dimensional environment, the two-dimensional data including images of the three-dimensional environment. The two and three-dimensional data are optionally received from a spatial mapping device configured to record images and a three-dimensional mapping of the environment. The method further comprises associating points of the two-dimensional data with points of the three-dimensional data, the association including identifying sets of points in the two and three-dimensional data that represent the same point or region in the three-dimensional environment; weighting the associations between the points of the two-dimensional data and points of the three-dimensional data, the weighting being based at least in part on a confidence that the two and three-dimensional data that represent the same point or region in the three-dimensional environment; selecting a subset of the images of the three-dimensional environment based on at least the weighting of the associations, the subset of the images representing those images that better represent points in the three-dimensional environment than the remaining images of the three-dimensional environment; labeling objects within the subset of images, the labeling including assigning image tags to objects within the subset of images, thereby associating the labels, and the objects, with points within the two-dimensional data; propagating the association of labels with points within the two-dimensional data to points within the three-dimensional data, using the associations between the points of the two-dimensional data and points of the three-dimensional data, such that a point in the two-dimensional data and a corresponding associated point in the three-dimensional data are assigned the same label; and propagating the association of labels with points in the three-dimensional data to points within the two-dimensional data.

In various embodiments the exemplary method further comprises using surface information from a three-dimensional surface within the three-dimensional data to produce labels for points in the two-dimensional images. In still other embodiments the method further comprises segmenting a tagged object in at least some of the two-dimensional images. In still other embodiments the method further comprises assigning a surface characteristic to one or more pixels in the two-dimensional images. In still other embodiments the method further comprises displaying, through a user interface, at least some of the two-dimensional and three-dimensional data including the labels associated therewith. In still other embodiments the method further comprises quantifying characteristics of the three-dimensional environment. In still other embodiments the method further comprises modifying two-dimensional images or three-dimensional data in response to the labeling. In still other embodiments the method further comprises using labeled two-dimensional images to train a machine learning system.

DETAILED DESCRIPTION

As used herein, the term "2D environment" is used to refer to a two-dimensional area or surface that can be mapped by a two-value coordinate system (e.g., x, y or θ, r). As used herein, the term "3D environment" is used to refer to a three-dimensional volume that can be mapped by a three-value coordinate system (e.g., x, y, z or φ, θ, r). Each of these environments may be represented by datasets including 2D or 3D data. Such data may also be associated with attributes such as a color or assignment to a particular object. Examples of 2D environments include an image or a view/projection of a 3D environment from a particular viewpoint. 2D and 3D datasets are also optionally further associated with a time dimension.

This present disclosure uses the terms "marking," "annotating," and "labeling" interchangeably with respect to assigning descriptive data to all or part of 2D and 3D images, meshes, and other representations of an object, space, or environment. By way of example an image can be labeled with the words "cat," "kitchen," "eating," and "sunset." Additionally, or alternatively, one or more rectangular or circular or other approximate regions within the image can be labeled with words like "cat," "chair," and "bowl." Staying with this same image, one or more sets of pixels can be labeled with a similar set of words. Equivalently, a 3D mesh or a point cloud can be labeled with words like "cat," "kitchen," "chair," "bowl," and "floor." Parts of the mesh can be labelled, where the parts are defined as approximate regions (for example using Axis-Aligned Bounding-Box, bounding sphere, or voxelized representations), or labels can be annotated to a set of mesh face identifiers, or portions of mesh faces, or point cloud point identifiers, or similar.

In each case such labels can facilitate a wide range of search and analysis operations such as "find all the cats," "how many kitchens have cats in them?" "does the presence of a cat in a kitchen increase the odds the kitchen has a bowl on the floor?" "is this region a kitchen chair?" Association of pixels with an object, in either 2D or 3D space or 3D+time (4D), can also facilitate the manipulation of videos and images. For example, identification of a cat in multiple frames of a video may be used to remove the cat or change the appearance of the cat.

Various embodiments of the present invention relate to operations on datasets that contain 2D data (such as images or videos), 3D data (such as point clouds, LiDAR data, 3D surface meshes as are used in the computer game industry, or 3D volume meshes as are used in finite element analysis computations), or a combination of 2D and 3D data, or 2D and/or 3D datasets and a time dimension. The datasets can also have multiple images (a single image is also referred to herein as a 2D data set) or data captured from different vantage points or at different times, even on different days. In the case where there are both 2D and 3D data, that data can be captured simultaneously by a single sensor (for example using an RGBD camera) or separately by separate sensors (for example one or more LiDAR scanners used in combination with one or more RGB cameras). Once the data has been captured and analyzed, the 2D images and 3D data can be combined to produce a textured 3D mesh, allowing further analysis of the combined 2D texturing and 3D shape data.

Figure 1:
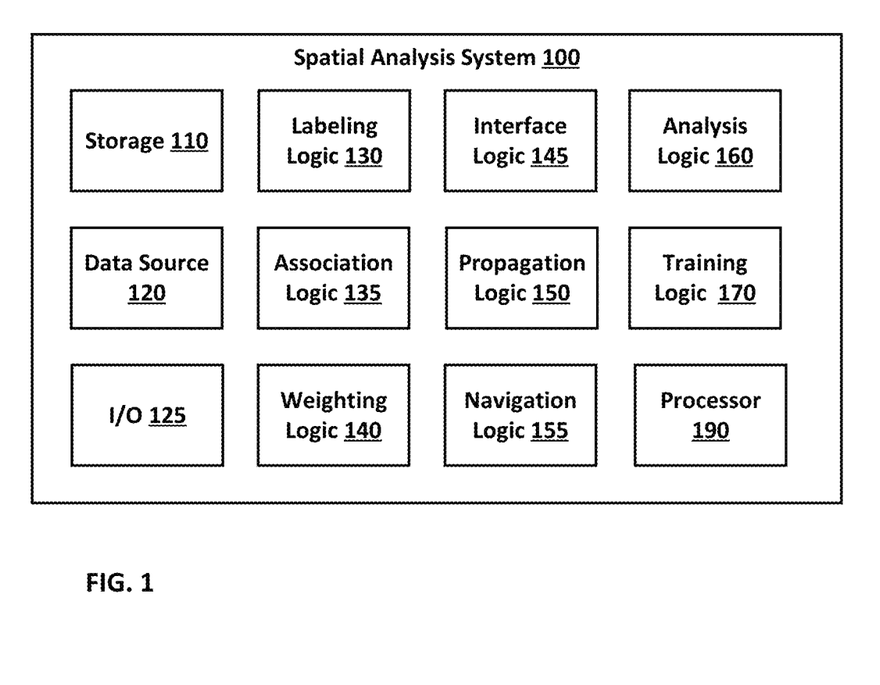
FIG. 1 illustrates a spatial analysis system according to various embodiments of the invention.

FIG. 1 illustrates a spatial analysis system according to various embodiments of the invention.

FIG. 1 illustrates a spatial analysis system 100 according to various embodiments of the invention. The spatial analysis system 100 comprises storage 110 configured to store two-dimensional data and three-dimensional data, the three-dimensional data representing a three-dimensional environment. The spatial analysis system 100 also comprises labeling logic 130 configured to label objects that are represented within the two-dimensional data, the labeling of these objects resulting in labels being assigned to the respective objects or being assigned to two-dimensional data points representing the respective objects. The spatial analysis system 100 further comprises association logic 135 configured to associate points within the two-dimensional data to points within the three-dimensional data, the association including a spatial proximity. The spatial analysis system 100 further still comprises weighting logic 140 configured to assign weights to the associations between points within the two-dimensional data and points within the three-dimensional data. The spatial analysis system 100 yet further comprises propagation logic 150 configured to propagate the labels from the objects within the two-dimensional data to objects within the three-dimensional data, responsive to the assigned weights. Moreover, the spatial analysis system 100 comprises a digital processor 190 configured to execute some or all of these logics, and at least the weighting logic 140 or the propagation logic 150. The spatial analysis system 100 can also comprise further logics described below. It will be appreciated that the spatial analysis system 100 can be distributed among one or more computing devices. The spatial analysis system 100 can include any combination of the optional elements described herein.

The storage 110 is configured to store two-dimensional data and three-dimensional data, the three-dimensional data representing a three-dimensional environment. The storage 110 can include any of the digital storage devices discussed herein. The stored 2D data can include surfaces, that optionally are flat, and can include surface characteristics such as colors and textures. Stored 3D data can include a point cloud and/or a mesh. In some embodiments, storage 110 optionally includes data structures specifically configured to store images 2D and 3D data.

The spatial analysis system 100 optionally comprises a data source 120. The data source 120 can include one or both of a 2D image capture device and a 3D capture device. For instance, the capture device can include one or more simple optical cameras, or more complex systems able to gauge distance as well as to collect images such as those described in U.S. Pat. No. 10,089,784. Additionally, data source 120 can include one or more video cameras as a source to provide either or both 2D and 3D data.

The spatial analysis system 100 optionally comprises an I/O 125 configured to receive commands, as well as 2D and/or 3D data and/or inputs from a user. I/O 125 can comprise such a network connection such as an Ethernet connection and/or a computing device input such as a USB port, as two examples.

The labeling logic 130 is configured to label objects within the two-dimensional data. Labeling of objects results in labels being assigned to respective objects or being assigned to two-dimensional data points representing these objects. In various embodiments the labeling logic 130 also is configured to label objects in 3D data. Examples of objects that can be identified by labeling logic 130 include people and faces, animals, photographs, paintings, chairs, doors, windows, vehicles, products on store shelves, warehouse inventory, and factory controls, etc. Any image tagging system that can be used for 2D or 3D tagging can be used as labeling logic 130. Such systems typically employ artificial intelligence (AI) to perform a feature extraction followed by a classification step in order to select appropriate words for the extracted feature. Feature extraction can be implemented using a deep convolutional neural network (CNN), for instance. Labels can be assigned to features using, for example, a non-parametric Gaussian naïve Bayes model.

The association logic 135 is configured to associate points within the two-dimensional data to points within the three-dimensional data. The association can be stored in storage 110, and includes, in some embodiments a spatial proximity. In some embodiments, associations are made by matching a projection of the 3D data along a viewpoint against 2D data. Associations between points in the 2D data and in the 3D data can then be made, for instance, by identifying common edges and shapes in the 2D data and the 2D projection of the 3D data. In various embodiments, when a viewpoint of the 3D data has been matched to a 2D data set, that 2D data set has a known orientation within the 3D coordinate system of the 3D data.

The weighting logic 140 is configured to assign weights to the associations between points within the two-dimensional data and points within the three-dimensional data. Exemplary factors that can be employed by weighting logic 140 in assigning weights include "cost function" (an error function in trying to match 2D and 3D data), the distinctiveness of features used to match (e.g., a sharp edge with a distinctive shape, or a distinctive profile, yields a higher confidence than a smooth somewhat flat surface); In some embodiments, weighing logic 140 identifies a two-dimensional data set that "best" represents the three dimensional data. Here, a best representation is a 2D data set that is weighted most highly based on some number of metrics, such as the confidence of the matching to the 3D data and/or the coverage of features in the 3D space. That is, if two 2D data sets both are matched to the 3D data with a same level of confidence, the one that shows a greater number of features would be rated higher between the two. Other aspects can also be considered in this ranking. One goal of the ranking can be to select a small number of available 2D data sets to actually apply the labeling logic 130. By applying labeling to just this subset of images, computational time can be saved.

The interface logic 145 is configured for a user to specify a point in the two or three-dimensional data by marking a common point in a plurality of 3D data and/or 2D data sets. The interface logic 145 can include the user interface of a smartphone, a tablet, laptop or desktop computer, etc. In some embodiments the interface logic 145 provides for navigating through a 3D space as described, for instance in U.S. Pat. No. 10,444,985, in order to mark points or regions within that space. As an example, a user can mark a common edge point in several 2D images and mark a corresponding point in the 3D data. Points and regions can be manually labeled e.g., "floor" or "wall."

In some embodiments, interface logic 145 is configured for a user to label objects within 3D data. For example, a user may view an object on a display (e.g., a user interface of a smartphone, a tablet, laptop or desktop computer, etc.), select the object and manually enter a label for that object. The label becomes associated with the 3D data representing that object. Specifically, the label can be assigned to a texel of a 3D textured mesh, for example. Optionally, when the object is selected the 3D textured mesh can be shown in the display. This gives the user an opportunity to edit or modify the mesh to better fit the desired object. Further, the user may navigate the 3D space relative to the object and confirm the mesh on multiple sides or in multiple views of the object. Once a label has been associated with an object in 3D data, it may be propagated to 2D data as described elsewhere herein.

The propagation logic 150 is configured to propagate labels from the objects within the two-dimensional data to objects within the three-dimensional data, responsive to the assigned weights. The propagation logic 150 does this by transferring labels from features in one or more 2D data sets to the same features in the 3D data according to the associations between points in both. Where there are multiple 2D images, several 2D images can each contribute to the same feature in the 3D data, and in some instances the labels may be the same, while in other instances some labels drawn from the several 2D images may be complimentary to each other or may be in conflict with one another. For example, several 2D images may label a chair, while one adds a label for cushion, and still another, having only a partial view of the chair, labels it as a post. The propagation logic 150, in some embodiments, is able to consolidate all of the labels for a feature, rank the labels, and remove poor labels that may conflict with others labels.

The propagation logic 150 is configured to propagate labels from the 3D data to 2D images. By starting with those 2D images ranked highest, and transferring labels from them to the 3D data, incorrect labels can be excluded and then the correct labels can be transferred back to those 2D images from which the excluded labels were derived. In this way all of the 2D images, and the 3D data, can be consistently labeled with correct labels. In the example above, the 2D image of the partially obscured chair would have the incorrect post label replaced with a chair label. Propagation logic 150 can similarly also be used to test associations between points. In still other embodiments, features are first labeled in 3D data and the propagation logic 150 propagates labels to the 2D data sets. Propagation can be iterative, working back and forth between 2D and 3D data.

Propagation logic 150 is optionally configured to propagate labels associated with objects in 3D data (manually or automatically) to 2D data. Once associated in 3D data the label can be assigned to many views of the object in the 2D data. In various embodiments, at least 25, 50, 100, 500 or 1000 views (2D images) of the object can thus be automatically (and efficiently) labeled from the one association in the 3D data. The association between the 3D data and the may views in 2D data may be based on an identifier of the image established by data source 120. For example, the image may be recorded contemporaneously with the collection of 3D data. The association between the 3D data and the may views in 2D data may be based on matching a shape or structure within the 2D and 3D data. The association between the 3D data and the may views in 2D data may be based on association between a particular pixel in the 2D data with a texel in the 3D data. Any one or combination of these three approaches may be used to establish the association between the 3D data and the may 2D images in the 2D data.

The spatial analysis system 100 optionally also comprises navigation logic 155. The navigation logic 155 is configured to navigate a three-dimensional environment represented by the 3D data, and to present the labels assigned to the objects within the 3D data to a user. In some embodiments the navigation logic 155 works in cooperation with the interface logic 145. The navigation logic 155 can employ, for example, methods described in U.S. Pat. No. 10,444,985.

The spatial analysis system 100 optionally also comprises analysis logic 160. The analysis logic 160 is configured to determine relationships between objects within the three-dimensional data based on the labels propagated to these objects and their spatial relationships within the three-dimensional environment. The analysis logic 160 is able to use the labels to make conclusions and generate answers to queries. For example, whether a firedoor are blocked, whether there is a correlation between surface temperature and AC usage, whether there is a correlation between pets and water bowls on the floor, how has the 3D environment has changed, and so forth. Analysis logic 160 may be used to make adjustments to the 2D or 3D data. For instance, a floor typically is flat, and if a floor is properly labeled as such, but also is labeled as bowed, the analysis logic 160 can check against the presumption of flatness against the available data to determine whether the floor is bowed or whether that label is an artifact.

Figure 3:
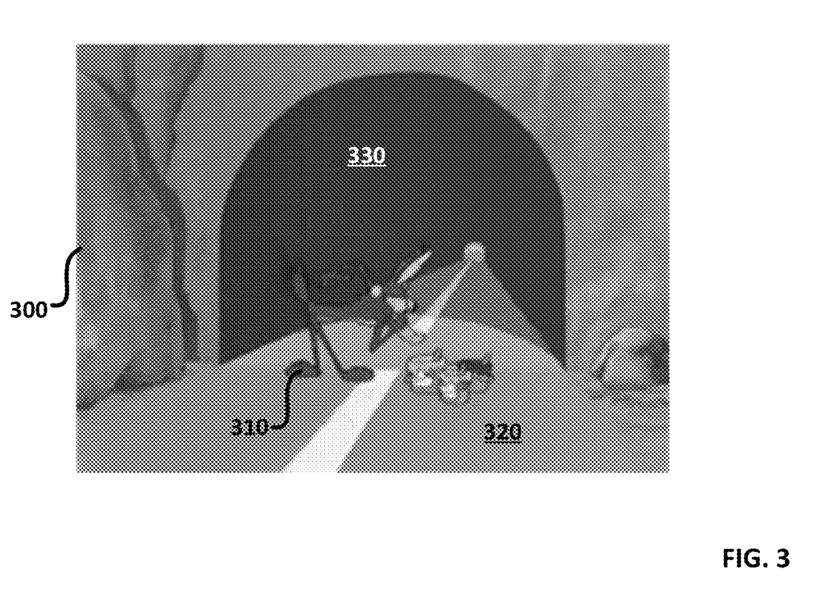
FIG. 3 illustrates an example of an image that may be analyzed using the systems and methods disclosed herein, according to various embodiments of the present invention.

For example, FIG. 3 shows a 2D image including an object that appears to be a tunnel in 2D but is also flat in 3D, thus more likely an image of a tunnel than an actual tunnel. Analysis logic 160 can employ other data that can be associated with the 3D Data, e.g., temperature data, changes over time from a common viewpoint, separating moving vs. stationary objects, time data, speed measurements, and dynamics. Analysis logic 160 can also segment a 3D space by determining boundaries between objects in the space.

The spatial analysis system 100 optionally also comprises training logic 170. The training logic 170, in some embodiments, is configured to train a machine learning system to better label objects. The training logic 170 can do this by training the machine learning system on two and/or three-dimensional data based on the labels propagated to objects within the three-dimensional data or the two-dimensional data. The training logic 170 takes both data types as input, as well as associations and weightings. Propagation from 2D images to 3D data and back to 2D images can be used to test training data and to generate additional training data. Training logic 170 can be used to train any of the logics described herein that employ artificial intelligence or machine learning, such as the labeling logic 130. Training logic 170 can also be used to train propagation logic 150 to detect disagreements between labels in 2D data and labels in 3D data. As another example, training logic 170 can train analysis logic 160 to detect images within images such as the image of the tunnel in the image of FIG. 3.

Figure 2:
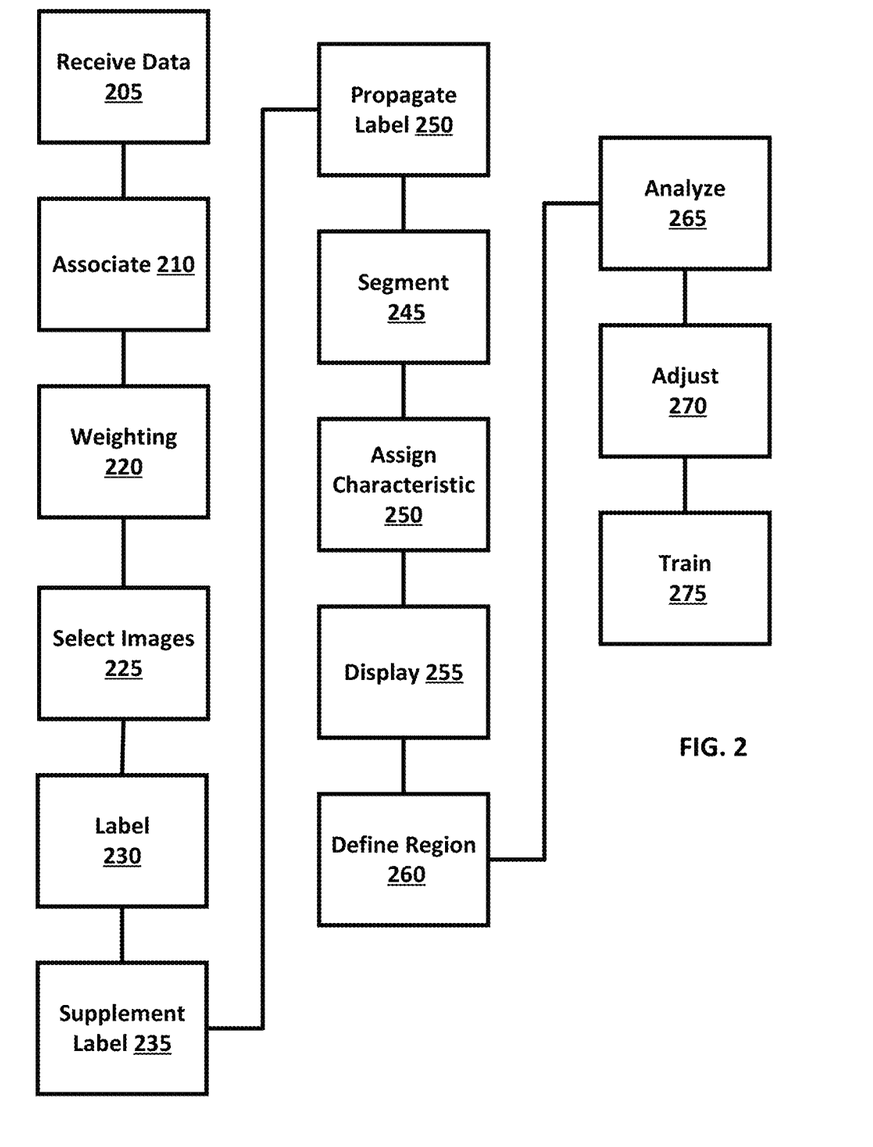
FIG. 2 illustrates methods of using both 2D and 3D data to process images, according to various embodiments of the present invention.

FIG. 2 is a flowchart representation of a method according to various embodiments of the present invention.

In a receive data step 205 a plurality of images are received, such as 2D and 3D data. These images can be received from a single camera, for example, or from some other source of many images, for example a collection of tourist photos of the Eiffel tower or a set of security cameras arranged around an area. In addition to images acquired by cameras, images may be generated by any number of processes. The received images optionally are part of a sequence that forms a video. The received images can be associated with metadata such as spatial and orientation information, which is also received along with the images. Images are optionally grouped by time and/or location, either as-received, or after receipt.

In receive data step 205, one or more of the received images are selected. Images can be selected, in some embodiments, that are most likely to result in a successful object identification (such as several images that present views along lines that are orthogonal to each other). Selecting images can include preprocessing, and where image features are used, all or some of the images can be preprocessed for these. Selection for successful object identification can be based, in some embodiments, on which images have the most unobstructed view of an object or region, with close, straight-on views weighted more heavily. Selection can be performed manually, through a user interface, or automatically.

In receive data step 205, a 3D representation of a space is received, where the 3D representation includes an object defined as a set of surface points within the 3D representation. The 3D representation can be retrieved from storage, can be generated from a plurality of 2D images, can be generated from distance measurements (e.g., LIDAR), or can be generated from a combination of 2D images and distance measurements e.g., RGBD cameras). See, for example, U.S. Pat. Nos. 10,579,138 and 10,089,784.

In an associate step 210, one or more 2D images and one or more 3D datasets are associated by making an association of many points in each 2D image to the corresponding photographed points in the 3D data and/or from many points in each 3D dataset to the corresponding viewpoint in each 2D image. As noted above, 3D data can comprise meshes, reconstructions, and others. The following disclosed methods pertain to 3D reconstructions, but it will be apparent to those skilled in the art that the same processes can be equally applied to other 3D data.

In associate step 210, at least some of the selected 2D images are associated with surface points of the object within the 3D representation. For instance, 2D images can be associated with surface points by projecting the 2D images into the 3D space and then accumulating information per volume element, surface element, or texture element (e.g. an image can be applied to a surface as a texture).

In an optional weighting step 220, where there are multiple 2D images or multiple 3D reconstructions, a weight or a score or a cost function is associated with each association between points in the 2D images and points in the 3D reconstruction, so that one or more "best" images, or reconstructions, can be selected for a given point of interest. This process identifies the 2D images that best represent a particular point on a 3D surface. For example, from a video of a chair taken by a person walking around the chair, the 2D video frames that best represent each side of the chair may be selected.

Weights, scores, or cost functions optionally can depend on a distance from the 2D image camera position to the 3D surface, or on the position of the 2D image camera position relative to the reconstructed surface, or on an angle of viewpoint of the camera relative to the surface position, or on the size of the surface point as seen by the 2D image camera, or position of the point in the field of view of the camera.

Optionally, in weighting step 220, the weighting is generalized such that multiple weights, scores, or cost functions are assigned to various associations so that different forms of "best" associations can be maintained. For example, where there are multiple 2D images of a table in 3D data, where those images are each taken from a different perspective, an association of a point in a first 2D image to a corresponding point in the 3D reconstruction can be given one weighting, score, or cost function where the camera position from which the 2D image is taken is closest to the location of the table in the 3D reconstruction, while another weighting, score, or cost function can be assigned to the association of a point in a second 2D image to a corresponding point in the 3D reconstruction where the 2D image is taken from a position most nearly perpendicular to the surface of the table in the 3D reconstruction near the point in question.

Optionally, in weighting step 220, the weighting, score, or cost function can also depend at least in part on the contents of the 2D image and 3D data near the point. Any parameter or feature in the 2D image or 3D data can be evaluated at and around the point and weighted more or less heavily based on the presence or absence of the feature or the magnitude of the parameter. For example, weightings, scores, or cost functions can also depend on the degree of texture of the surface near the point, with smoother surfaces weighted higher and bumpier surfaces weighted lower. As another example, higher or lower weights can be assigned to brighter or darker content near the point. A confidence measure that the area near the point includes an edge is another example.

In still further embodiments the weighting, score, or cost function can also be based at least in part on whether a 2D image was used, in whole or in part, to generate or compute the 3D data. For instance, an association between a point in 3D data and a corresponding point in a 2D image can be weighted more heavily if the 2D image was used to generate the 3D data. Associations to points in 2D images that were fully used to generate the 3D data can be weighted more heavily than associations to points in 2D images that were only partially used in the reconstruction.

In various embodiments, instead of associations between corresponding points, the associations are made between corresponding regions in the 2D images and the 3D reconstruction. In some of these embodiments, the regions can be selected based on any number of parameters or properties, and can be selected manually or can be automatically generated. For example, regions optionally can be based on color properties or shape properties. In these embodiments, image analysis software can be employed to automatically generate regions based on color and/or shape. Image analysis software can comprise machine learning algorithms trained on sufficient volumes of 2D images and/or 3D data. It will be appreciated that multiple regions can be maintained that cover, or are associated with, a single set of 2D and 3D data, and these regions can, in some instances, completely or partially overlap each other. Regions can also be grouped into sets, and in some embodiments the sets are selectable through a user interface, discussed further below.

In a label step 230 the association between 2D and 3D points allows 2D image points to be used to label 3D points, or to allow 3D points to be used to label 2D images points, such as in a 2D projection of 3D data. In some of these embodiments the association of multiple points in 2D images to corresponding points on a 3D surface provides a number of suggested labels for a point in the 3D reconstruction. These labels can optionally be assigned a weight, score, or cost where the ones weighted highest define a reduced set of "best" labels; the weights can also be used to compute composite weights or scores or costs for one or more 3D point labels.

In some embodiments, the weight or score or cost assigned to a label for a 3D surface point, based on a label from a corresponding point in a 2D image is, in whole or in part, based on a confidence or error estimate of that 2D image. Also, in some embodiments, the weight or score or cost is, in whole or in part, based on a weight or score or cost assigned to the association between the point in the 2D image and the corresponding point in the 3D reconstruction.

In label step 230, the object within the 2D images previously selected is identified. For example, 2D image areas can be marked and classified. This can be done simply by stating the objects contained in the whole image, providing a list of object localizations with types (positions, rectangles, ovals), or by segmenting the image by marking bounding polygons or marking individual pixels (e.g. certain pixels can be marked as "cat"). This marking and classification may include an intermediate step of "feature" identification (such as corners, edges, and regions). These features and regions may also be associated with points or regions as useful information. By using more labelled 2D images than are strictly necessary the quality and accuracy of the predictions can be confirmed, and this can also be useful for ensuring that labels added manually are accurate. Aspects of label step 230 can be performed manually, automatically through machine learning, or through a combination of both.

In label step 230, the identified object is further identified within the 3D data based on the prior identification of the object within the 2D data sets and the associations determined in between 2D and 3D data. By identifying the object in different 2D images taken from different viewpoints and then marking parts of the 3D data, a more complete 3D representation can be created. In further embodiments a portion of the 3D data in and around the area in view of a camera, represented as points, voxels, or surfaces for example, is paired with synthetic per pixel surface information (such as depth, normal, local curvature).

In label step 230, further members of the plurality of 2D images are selected. These 2D images may be chosen for criteria such as clarity, colorfulness, orthogonality to other images, confidence of automatic object detections, number of classes of object detected, etc. In video image sequences, images may be chosen to be spaced out in time or at some minimal interval, images with minimal motion in them may be preferred, etc. Some of these embodiments optionally include a step in which at least part of each of the further images are associated with surface points of the object within the 3D data.

In an optional supplement label step 235, 3D surface information from the 3D surface is used to produce labels for points in the 2D images. For example, using flatness and/or orientation to suggest labels such as "floor" or "wall" or "flat" or "cylindrical column." This step can be performed by analysis logic 160, in some embodiments.

In an optional propagate label step 240, the reduced set of "best" labels, or composite weights or scores or costs previously assigned to the point in the 3D data are assigned to one or more corresponding points in 2D images. In this way the 3D data can be thought of as an accumulator, each point on the 3D surface accumulates the various labelling information from the several 2D images, find the best labels for each point, and then transfers that information back onto the 2D images so that consistent labels exist across all 2D and 3D data.

Embodiments that include step 240 optionally can include a step in which the object in each of the further 2D images is identified based on the association of the surface points and the identification of the object. Knowledge of the 3D object within the 3D space makes identification of the object in 2D images much easier and cost effective. By taking the labelled 3D data and rendering projections of it back into the 2D images one can achieve object recognition and segmentation in the other 2D images with confidence and accuracy, even in images where only a tiny fragment (unrecognizable in isolation) of the object is visible. This also means that only one or a few input images may be need to be manually marked to perform automatic marking of thousands of images.

In an optional segment step 245, the identified object is segmented in each of the further members of the plurality of 2D images. These segmentations can be used to highlight the object in the 2D images, making it visible when it may not have been apparent to the human eye. This step can also be performed by analysis logic 160, in some embodiments.

In an optional assign characteristic step 250, one or more pixels in the 2D images previously selected are assigned surface information (such as depth, normal, or local curvature). At this point in the exemplary method a full 3D representation of the object exists, and the pose (position & orientation) of all cameras in that 3D space are known, therefore it is possible to generate surface information for pixels in the 2D images by rendering a surface image using the 3D representation from the camera's pose. This surface information can be used for further segmentation of 2D images, or depth correct image compositing, or to make AR objects interact realistically with the environment in the image.

In assign characteristic step 250, one or more physical characteristics of an object can also assigned to an identified object based on the object's identification. For example, if an object is identified as a couch, it may be assigned physical characteristics that would be expected of a couch and its materials. Further, the couch may be assigned as an object that an AI character could sit on, or it may assign a compressibility factor or a bounciness factor such that interactions with the object produce realistic, exaggerated, or humorous, effects.

By understanding an object's 3D size and shape, and also its underlying type, it becomes possible to replace the object with other objects. For instance, a worn couch can be virtually replaced with new models from a retailer. Additionally, by understanding a 3D space itself, it becomes easier to differentiate an image of an object, such as a poster of a lamp, from the actual presence of a lamp. As another example, a floor can be differentiated from a floor with a rug. A painting of a tunnel on a wall can be differentiated from a tunnel.

In an optional display label step 255, 2D images and 3D data, having labels associated therewith, can be provided to a user through a user interface, allowing the data to be viewed and manipulated by the user. In particular, one or more 2D images and the 3D data can be presented through the user interface, showing corresponding points or regions, either simultaneously or in alternation, along with labels for such points and regions.

The user interface optionally provides means for selecting points, regions, or sets of regions. Such means can comprise common computer controls such as a mouse and keyboard, touch screens, and the like. In this way a user can click or touch on points or regions in displays of 2D and 3D data, or paint within such displays, to make selections. The user interface also allows the user to select points or regions within one or more 2D images to select points or regions in the associated 3D data, or select within 3D data points or regions in the associated 2D images.

In some of these embodiments, one or more of the plurality of 2D images is manipulated based on a prior object identification. Objects in the 3D data, once marked, can be removed, moved, manipulated, or replaced in useful ways. For example, to provide an unobstructed view of a 3D scene, people or furniture can be removed from the 3D data. Similarly, a virtual green screen can be created by masking out everything except a person. Various objects can be moved around the 3D scene, for instance, to show alternative arrangements. Specific objects can be replaced by the same type of object, but in a different style.

In an optional define region step 260, a user interface optionally allows the user to switch between viewing or interacting with 2D images and viewing or interacting with 3D surfaces, allowing for example the user to start selecting a region for labeling in a 3D view and then switching to continue or refine the selected region in a 2D image view. In various embodiments, the user interface allows the user to manipulate data by moving, panning, or zooming within a 2D image or 3D data to facilitate the manual defining of 2D or 3D regions. Further, in some embodiments, a view of a 3D dataset can move automatically in response to a user selection or movement within a corresponding 2D image, and similarly selecting or moving within 3D data can optionally automatically change the view of a displayed 2D image.

Optionally, more than one label can be assigned to a point or region through the user interface. The user interface, in some embodiments, permits a user to copy and paste one or more labels onto a new point or region, where the label or labels are copied from a label or labels on a recently created point or region, such as the most recently created point or region. The user interface optionally also permits a user to revise the label or labels on one or more points or regions.

In some embodiments, the spatial analysis system is configured to suggest and display to the user labels through the user interface based on an automated understanding of information in the 2D images or 3D data. In still further embodiments, the system includes artificial intelligence to suggest labels based on training data such as labels assigned by human image labelers. In still other embodiments, image recognition software can be used to analyze 2D images to identify objects therein such as people, chairs, or signs. Such identified objects can be used as labels in the 2D images that can be transferred to the 3D data, as described above. Similarly, shape recognition software can be applied to analyze 3D data to determine labels that can be transferred to the corresponding 2D images. For instance, such shapes can be identified as floors, walls, and cylindrical columns.

In an optional analyze step 265, characteristics of the environment are quantified such that they can be treated in a quantitative manner. For example, counts of various objects may be determined, distances between objects may be determined, changes in objects may be noted. Quantitative information such as surface area, volume, expected mass, expected radio signal permittivity, expected flammability, overall color etc. may be stored and queried. Qualitative information such as whether an object is attached to the environment or free to move, whether it can be sat on or not, etc. may also be stored and queried.

This quantitative and optionally qualitative information can be stored in a database such as storage 110. Complex queries on this information may be made simply by selecting all objects in a given area, for example, to perform fire safety audits, determine 5G wifi antenna placements, to find the number of seats in a room, to determine camera coverage in an area, to detect blocked doors, etc.

In analyze step 265, objects and their attributes may be compared against previous analyses. For example, changes in object counts (i.e. the number of chairs in the room changed), changes in object positions (i.e. such a blocking a fire door or not, or a latch properly engaged/not engaged), and changes in other measured or inferred attributes (such as locked/unlocked, mass, temperature, etc.) can be determined.

Also, in analyze step 265, starting with a well labelled 3D environment, and the identified objects of a 2D image or a series of 2D images, it becomes possible to locate the position of a camera based on objects alone. For example, if the 2D image contains a white board and a wooden table and there is only one room in the 3D environment with these two items, then it becomes possible to immediately infer which room the camera is in.

For example, an engineer at a processing plant (already tagged and labelled in a 3D representation) could determine their precise location accurately by holding up their camera and letting the software determine what types of objects are in view. They could then go on to tag/label objects in view that were previously unknown to the database, for example parts of a new pipe being placed. Once localized, it becomes easy to tag objects on the phone by extracting them against the background of previously known objects. Additional views of the same object can be used to make a more complete 3D tagging of the object on or off site.

2D annotation is usually done by marking pixels (discreet picture elements—usually square) or regions of an image (bounding rectangles, ellipses, or polygons). 3D Annotation is analogous in that voxels (volume elements—usually cubes) or regions of space (bounding boxes, ovoids, or meshes) are marked, and also because surface representations (usually triangles) are common for the data surfaces themselves and can be labeled in a fashion similar to images.

In an optional adjust step 270, 2D images and/or 3D data can be modified in response to the labeling. For instance, areas identified as flat because of a label indicating a flat surface, like a floor or a wall, can be smoothed. As another example, 2D images and/or 3D reconstructions can be modified to removing features such as people from the 2D images and 3D data, or to add features such as highlighting around walkable areas.

In an optional train step 275 labeled 2D images and/or 3D data are used to train machine learning systems, specifically to train 2D algorithms or 3D algorithms or combined 2D/3D algorithms. These algorithms can include AI/ML/CNN/DNN algorithms that can generate a 3D component from a set of weighted 2D images, allowing for 3D reconstruction in the absence of 3D sensors from 2D images.

In train step 275, the identification of the object in the further 2D images can be added to a corpus of data used to train an image classifier to identify objects. Training for machine learning that is based on recognition and segmentation systems requires very large labelled data sets, but these can be laborious to generate where each image must be manually labelled. The systems disclosed herein obviate this problem because each object identification in a few 2D images can be amplified to produce segmentations across the many other 2D images. Typically, for a video moving through an interior scene at a walking speed the amplification ratio is about 1 to 1000. The larger segmented set thus becomes an ideal source of labeled 2D images for training 2D recognition and segmentation systems. The metadata associated with 2D images can also be employed for training AI and can include 3D information derived from the 3D data, either directly or as per pixel surface information.

FIG. 3 illustrates how a system of the present invention can distinguish between the conflicting interpretations of an image. An artificial intelligence system could classify this image according to a "road runner" view in which the image includes a tunnel, or it could classify the image according to a "coyote" view in which the image includes a painting on a rock wall depicting a tunnel. By combining two-dimensional data with three-dimensional data the machine learning system can be trained to distinguish between 3D objects and two-dimensional representations of the 3D objects, a very hard problem to train for.

Figure 4:
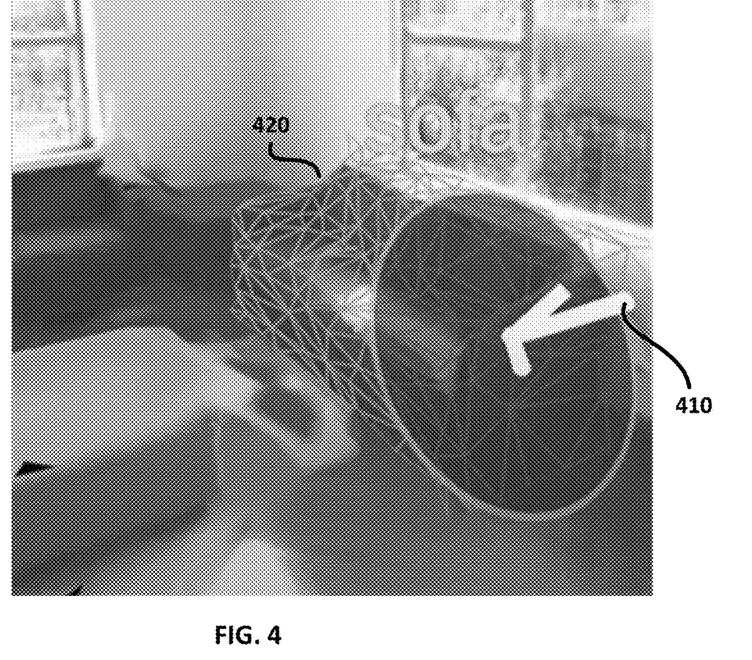
FIG. 4 illustrates selection of an object in 3D data, according to various embodiments of the present invention.

FIG. 4 illustrates selection of an object in 3D data, according to various embodiments of the present invention. In this illustration, 3D data is presented to a user through a user interface. In this example, a sofa is selected using selection tool 410 and is represented by a 3D wire mesh 420. The user can then view the sofa from a different viewpoint and confirm the mapping of the object in 3D before manually providing a label "sofa." Once this label is associated with the sofa, the label is easily propagated to any or all views (in 2D or 3D data) of the sofa. This includes views in which the sofa is partially or mostly hidden and only partially visible. The resulting labels and data sets can be used to train a machine language system, e.g., train labeling logic 130 using training logic 170, to recognize objects even when the objects are partially or mostly hidden.

Figure 5:
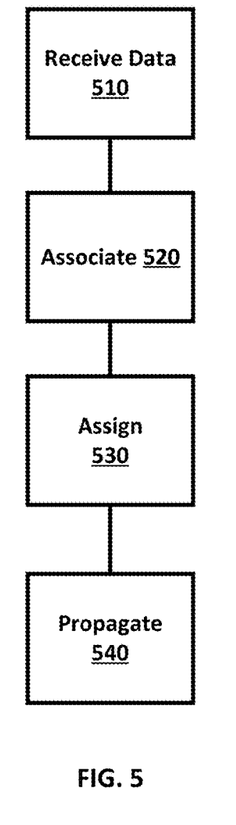
FIG. 5 illustrates methods of automatically labeling 2D data, according to various embodiments of the present invention.

FIG. 5 illustrates an exemplary method of automatically labeling 2D data, according to various embodiments of the present invention. In a receive step 510 2D and 3D data representing the object is received, optionally according to an embodiment of step 205 of FIG. 2. Here, the 2D data includes multiple 2D images each with a different viewpoint of the object. 2D images with different viewpoints are also referred to herein as "views." Receiving this 2D and 3D data can comprise retrieval from storage 110, for example. In other embodiments receiving this 2D and 3D data can comprise acquiring the 2D and 3D data from a mapping system such as one or more data sources 120. In further embodiments, the 3D data is a reconstruction of the 2D data, that is, only the 2D data comes from a data source 120, and the 2D data is used to assemble the 3D data. In various embodiments the 2D and 3D data are received from a mapping system that is configured to contemporaneously record 2D images of the object and generate a 3D map of the object. Here, contemporaneously, means occurring in the same period of time. That is, the 3D data and the 3D map of the object become available to a user to manipulate almost as soon as the processor 190 can create the 3D space from the 2D images.

In an associate step 520, points on the object in the 3D data are associated with points on the object in the 2D images. The points on the object in the 3D data can be pixels or texels, for example. The associations are optionally made as described above with respect to FIG. 2 and the step 210.

In an assign step 530, a label is assigned to the object in the 3D data. This step is optionally performed as described above with respect to FIG. 2 and step 230. In various embodiments step 530 is performed manually, that is, by a user through a user interface. In some of these embodiments the user does this while navigating the 3D environment by touching on a point on a touchscreen or by positioning a pointer on the object and clicking a mouse.

In a propagate step 540, the label is propagated to the 2D images based on the associated points, optionally according to an embodiment of step 250 of FIG. 2. In some embodiments, the label is propagated to at least 25, 50, 100, 500, or 1000 2D images within the 2D data, each with a different viewpoint, based on a single assignment of the label in the 3D data. In some of these embodiments the label is propagated to a 2D image having a viewpoint of the object such that less than 5%, 10%, 20%, or 50% of the object is visible. Generally, the remainder of the object is obscured in this view.

Several embodiments are specifically illustrated and/or described herein. However, it will be appreciated that modifications and variations are covered by the above teachings and within the scope of the appended claims without departing from the spirit and intended scope thereof. For example, the systems and method described herein may be used on video as well as still images. The two and three-dimensional data discussed herein may further be associated with a "time" dimension. For example, time may be involved where an object is moving through a 3D space; when separately identifying stationary and moving objects (e.g. walking people or vehicles); to monitor changes that occur over time in a 3D space; lighting changes (night v. day, IR), and time-varying non-visual data (e.g., temperature).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise digital memory, volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. A computer-readable medium, as used herein, expressly excludes paper or transient signals. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored on a non-transient computer readable medium, or combinations thereof. This logic may be implemented in an electronic device, e.g., circuits, to produce a special purpose computing system.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A spatial analysis system comprising:
   storage configured to store two-dimensional data and three-dimensional data, the three-dimensional data representing a three-dimensional environment;
   labeling logic configured to label objects within the two-dimensional data, the labeling of objects resulting in labels being assigned to respective objects or being assigned to two-dimensional data points representing the respective objects;
   association logic configured to associate points within the two-dimensional data to points within the three-dimensional data;

weighting logic configured to assign weights to the associations between points within the two-dimensional data and points within the three-dimensional data;

propagation logic configured to propagate the labels from the objects within the two-dimensional data to objects within the three-dimensional data, responsive to the assigned weights; and a digital processor configured to execute at least the weighting logic or the propagation logic.

2. The system of claim 1, further comprising a data source including an 2D image capture device and a 3D capture device.

3. The system of claim 1, further comprising an I/O configured to receive 2D and 3D data.

4. The system of claim 1, further comprising interface logic configured for a user to specify a point in both 2D data and 3D data by marking the point in either data.

5. The system of claim 1, further comprising navigation logic configured to navigate the three-dimensional environment represented by the three-dimensional data, and to present the labels propagated to the objects within the three-dimensional data to a user.

6. The system of claim 1, further comprising analysis logic configured to determine relationships between objects within the three-dimensional data based on the labels propagated to these objects and their spatial relationships within the three-dimensional environment.

7. The system of claim 1, further comprising training logic configured to train a machine learning system to label objects in additional two or three-dimensional data based on the labels propagated to objects within the 2D data or the 3D data.

8. A method of modeling a three-dimensional environment, the method comprising:

receiving two-dimensional data and three-dimensional data regarding a three-dimensional environment, the two-dimensional data including images of the three-dimensional environment;

associating points of the two-dimensional data with points of the three-dimensional data, the association including identifying sets of points in the two and three-dimensional data that represent the same point or region in the three-dimensional environment;

weighting the associations between the points of the two-dimensional data and points of the three-dimensional data, the weighting being based at least in part on a confidence that the two and three-dimensional data that represent the same point or region in the three-dimensional environment;

selecting a subset of the images of the three-dimensional environment based on at least the weighting of the associations, the subset of the images representing those images that better represent points in the three-dimensional environment than the remaining images of the three-dimensional environment;

labeling objects within the subset of images, the labeling including assigning image tags to objects within the subset of images, thereby associating the labels, and the objects, with points within the two-dimensional data;

propagating the association of labels with points within the two-dimensional data to points within the three-dimensional data, using the associations between the points of the two-dimensional data and points of the three-dimensional data, such that a point in the two-dimensional data and a corresponding associated point in the three-dimensional data are assigned the same label; and propagating the association of labels with points in the three-dimensional data to points within the two-dimensional data.

9. The method of claim 8, further comprising using surface information from a three-dimensional surface within the three-dimensional data to produce labels for points in the two-dimensional images.

10. The method of claim 8, further comprising segmenting a tagged object in at least some of the two-dimensional images.

11. The method of claim 8, further comprising assigning a surface characteristic to one or more pixels in the two-dimensional images.

12. The method of claim 8, further comprising displaying through a user interface at least some of the two-dimensional and three-dimensional data including the labels associated therewith.

13. The method of claim 8, further comprising quantifying characteristics of the three-dimensional environment.

14. The method of claim 8, further comprising modifying two-dimensional images or three-dimensional data in response to the labeling.

15. The method of claim 8, further comprising using labeled two-dimensional images to train a machine learning system.

16. The method of claim 8, wherein two and three-dimensional data are received from a spatial mapping device configured to record images and a three-dimensional mapping of the environment.

\* \* \* \* \*